United States Patent
Pang et al.

(10) Patent No.: US 9,460,044 B2
(45) Date of Patent: Oct. 4, 2016

(54) FORMULA CALCULATION METHOD AND ELECTRONIC DEVICE THEREFOR

(71) Applicant: Samsung Electronics Co., Ltd, Gyeonggi-do (KR)

(72) Inventors: Jeong-Hyun Pang, Gyeonggi-do (KR); Seung-Soo Woo, Gyeonggi-do (KR); Pil-Joo Yoon, Gyeonggi-do (KR); Yong-Joon Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 14/137,798

(22) Filed: Dec. 20, 2013

(65) Prior Publication Data
US 2014/0181163 A1    Jun. 26, 2014

(30) Foreign Application Priority Data
Dec. 20, 2012    (KR) ........................ 10-2012-0149828

(51) Int. Cl.
*G06F 15/02*    (2006.01)
(52) U.S. Cl.
CPC ..................................... *G06F 15/02* (2013.01)
(58) Field of Classification Search
CPC .................................................... G06F 15/02
See application file for complete search history.

(56) References Cited

U.S. PATENT DOCUMENTS

| | | | |
|---|---|---|---|
| 7,117,435 B1 | 10/2006 | Kotler et al. | |
| 8,671,125 B2 * | 3/2014 | Muraki | G06F 15/02 708/130 |
| 8,818,033 B1 * | 8/2014 | Liu | G06K 9/6814 382/103 |
| 2008/0115056 A1 * | 5/2008 | Escapa | G06F 17/215 715/267 |
| 2013/0191424 A1 * | 7/2013 | Hale | G06F 3/04886 708/130 |
| 2013/0205200 A1 * | 8/2013 | Lazarevic | G06K 9/00463 715/244 |

FOREIGN PATENT DOCUMENTS

| | | |
|---|---|---|
| JP | H05-101046 | 4/1993 |
| JP | H10-177334 | 6/1998 |
| JP | 2005-031798 | 2/2005 |
| KR | 10-2010-0118829 | 11/2010 |

* cited by examiner

*Primary Examiner* — Chuong D Ngo

(57) ABSTRACT

A method for calculating a formula included in text in an electronic device includes detecting the text, detecting at least one formula included in the detected text, calculating at least the one formula, and displaying the calculated result. An apparatus for implementing the method includes at least one processor, at least one memory, and at least one program which is stored in at least the one memory and is configured to be executable by at least the one processor. The at least one program detects input text, detects at least one formula included in the detected text, calculates at least the one formula, and displays the calculated result.

18 Claims, 19 Drawing Sheets

FORMULA CALCULATION METHOD AND ELECTRONIC DEVICE THEREFOR

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Dec. 20, 2012 and assigned Serial No. 10-2012-0149828, the entire disclosure of which is hereby incorporated by reference.

TECHNICAL FIELD

The present disclosure relates to a method and apparatus for calculating a formula included in text in an electronic device.

BACKGROUND

Electronic devices have become necessities of modern people due to ease in carrying them. They have been developed into multimedia devices which provide various services, such as voice and video communication services, information input and output services, data storage services, photography services, e-mail services, message services, memo services, and calculator services. Calculator services can include normal calculator services and engineering calculator services.

When it is necessary to calculate a formula during text input in an application program, the electronic device changes a screen and executes a separate calculator application program. Thereafter, the electronic device calculates an input formula, and copies and displays the calculated value on a screen of the application necessary for calculating the formula.

As described above, there is inconvenience when a plurality of processes must be performed to calculate a formula included in text in an application program.

SUMMARY

To address the above-discussed deficiencies, it is a primary object to provide a method and apparatus for calculating a formula in an electronic device.

Certain embodiments of the present disclosure provide a method and apparatus for calculating a formula included in text in an electronic device.

Certain embodiments of the present disclosure provide a method and apparatus for calculating a formula included in text of a specific region in an electronic device.

In accordance with certain embodiments of the present disclosure, a method of calculating a formula included in text in an electronic device is provided. The method includes detecting the text, detecting at least one formula included in the detected text, calculating at least the one formula, and displaying the calculated result.

In accordance with another certain embodiments of the present disclosure, an electronic device is provided. The electronic device includes at least one processor, at least one memory, and at least one program which is stored in at least the one memory and is configured to be executable by at least the one processor, wherein at least the one program detects input text, detects at least one formula included in the detected text, calculates at least the one formula, and displays the calculated result.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Exemplary embodiments of the present disclosure will be described herein below with reference to the accompanying drawings. In the following description, well-known functions or constructions are not described in detail since they would obscure the disclosure in unnecessary detail.

Hereinafter, a description will be given for a method and apparatus for calculating a formula included in text in an electronic device. The electronic device can be, for example, any one of a mobile communication terminal, a Personal Digital Assistant (PDA), a laptop, a smart phone, a netbook, a television, a Mobile Internet Device (MID), a Ultra Mobile Personal Computer (UMPC), a tablet PC, a navigation device, and a Moving Picture Experts Group (MPEG) layer 3 (MP3) player.

Figure 1:
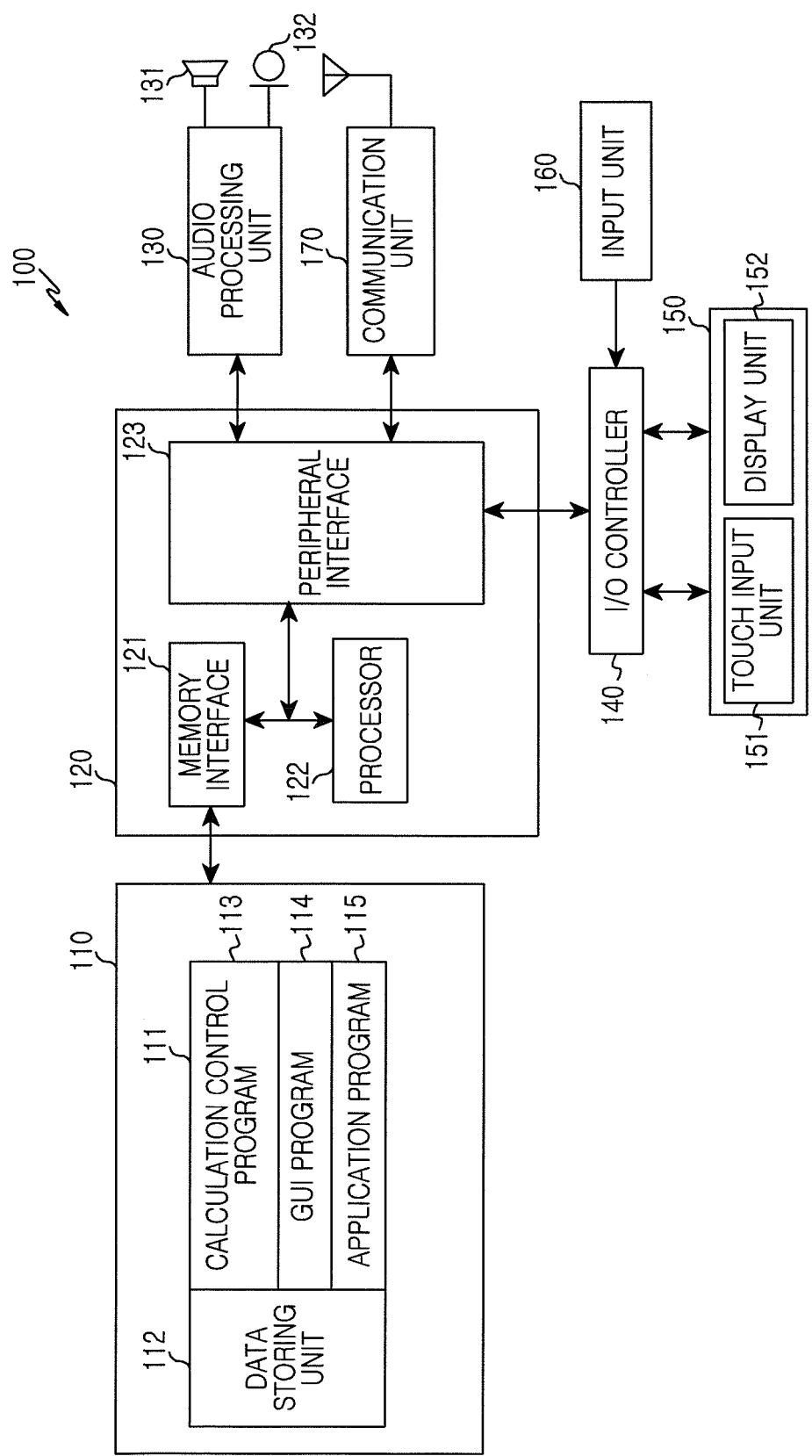
FIG. 1 illustrates a configuration of an electronic device according to certain embodiments of the present disclosure.

FIG. 1 illustrates a configuration of an electronic device according to certain embodiments of the present disclosure. As shown in FIG. 1, the electronic device denoted by 100 can include a memory 110, a processor unit 120, an audio processing unit 130, an Input/Output (I/O) controller 140, a touch screen 150, an input unit 160, and a communication unit 170. Herein, the memory 110 can be a plurality of memories.

The memory 110 can include a program storing unit 111 for storing programs for controlling operations of the electronic device 100 and a data storing unit 112 for storing data generated while the programs are executed. The program storing unit 111 includes a calculation control program 113, a Graphic User Interface (GUI) program 114, and at least one application program 115. Herein, the programs included in the program storing unit 111 can be expressed in an instruction set as a set of instructions.

The calculation control program 113 can include at least one software component for calculating a formula included in text. For example, when a formula calculation event is generated in an application program, the calculation control program 113 calculates a formula included in text input to the application program and obtains a result value. Further, after a result value is obtained through formula calculation, when a correction event for a formula is generated, the calculation control program 113 can calculate a corrected formula and obtain a result value. In another example, when a formula calculation event is generated, the calculation control program 113 can calculate a formula included in text of a set partial region of the entire text.

The GUI program 114 can include at least one software component for providing a UI as graphics on a display unit 152. For example, the GUI program 114 performs a control operation to display text input to the application program on the display unit 152. The GUI program 114 can perform a control operation to display a result value according to formula calculation, transmitted from the calculation control program 113, on the display unit 152. When a partial text is selected in the entire text, the GUI program 114 can perform a control operation to apply a previously defined form to the selected partial text and display the applied form on the display unit 152. Herein, the previously defined form can include an underline, deepness, a slope, a color, a shadow, a highlighter, and a size.

The application program 115 can include a software component for at least one application program installed in the electronic device 100. The processor unit 120 can include a memory interface 121, at least one processor 122, and a peripheral interface 123. Herein, the memory interface 121, at least the one processor 122, and the peripheral interface 123 which are included in the processor unit 120 can be integrated in at least one Integrated Circuit (IC) or be separately implemented. The memory interface 121 controls when a component like the processor 122 or the peripheral interface 123 accesses the memory 110. The peripheral interface 123 controls connection among an I/O peripheral of the electronic device 100, the processor 122, and the memory interface 121.

Figure 2:
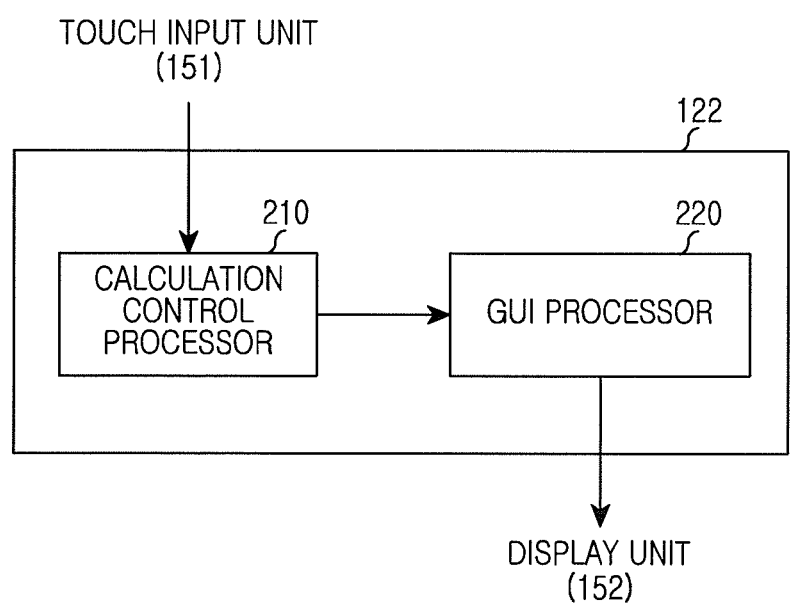
FIG. 2 illustrates a detailed configuration of a processor according to certain embodiments of the present disclosure.

The processor 122 provides a variety of multimedia services using at least one software program. Also, the processor 122 executes at least one program stored in the memory 110 and provides a service according to the corresponding program. For example, the processor 122 can be, as shown in FIG. 2, configured to execute the calculation control program 113 and calculate a formula included in text.

The audio processing unit 130 provides an audio interface between a user and the electronic device 100 through a speaker 131 and a microphone 132. The I/O controller 140 provides an interface between I/O devices, such as the display device 152 and the input unit 160, and the peripheral interface 123.

The touch screen 150 is an input and output device for inputting and outputting information. The touch screen 150 can include a touch input unit 151 and the display unit 152. The touch input unit 151 provides touch information sensed through a touch panel to the processor unit 120 through the I/O controller 140. That is, the touch input unit 151 provides touch information by an electronic pen or a finger of the user to the processor unit 120 through the I/O controller 140.

The display unit 152 displays state information of the electronic device 100, characters input by the user, moving pictures, still pictures, etc. For example, the display unit 152 displays text input to an application program by the GUI program 114. In another example, the display unit 152 can display a result value according to formula calculation by the GUI program 114. In yet another example, the display unit 152 can apply a previously defined form to partial text and display the applied form by the GUI program 114. The previously defined form can include at least one of an underline, deepness, a slope, a color, a shadow, a highlighter, and a size. The input unit 160 provides input data generated by a selection of the user to the processor unit 120 through the I/O controller 140. In one example, the input unit 160 includes only a control button for control of the electronic device 100. In another example, the input unit 160 can be configured as a keypad for receiving input data. The communication unit 170 can include at least one software component for performing a communication function for voice communication and data communication.

Herein, the communication unit 170 can be classified into a plurality of communication sub-modules which support different communication networks. For example, the communication network can be, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LIE) network, an Orthogonal Frequency Division Multiple Access (OFDMA) network, a wireless Local Area Network (LAN), a Bluetooth network, a Near Field Communication (NFC) network.

FIG. 2 illustrates a detailed configuration of a processor according to certain embodiments of the present disclosure.

As shown in FIGS. 1 and 2, the processor 122 can include a calculation control processor 210 and a GUI processor 220.

The calculation control processor 210 executes the calculation control program 113 of the program storing unit 111 and calculates a formula included in text. For example, when a formula calculation event is generated in an application program, the calculation control processor 210 calculates a formula included in text input to the application program and obtains a result value. In another example, after a result value is obtained through formula calculation, when a correction event for a formula is generated, the calculation control processor 210 can calculate a corrected formula and obtain a result value. Also, in another example, when a formula calculation event is generated, the calculation control processor 210 can calculate a formula included in text of a set partial region of the entire ext.

The GUI processor 220 executes the GUI program 114 of the program storing unit 111 and provides a UI as graphics on the display unit 152. For example, the GUI processor 220 performs a control operation to display text input to the application program on the display unit 152. In another example, the GUI processor 220 can perform a control operation to display a result value according to formula calculation, transmitted from the calculation control processor 210, on the display unit 152. In another example, when a partial text is selected in the entire text, the GUI processor 220 can perform a control operation to apply a previously defined form to the selected partial text and display the applied form on the display unit 152. Herein, the previously defined form can include at least one of an underline, deepness, a slope, a color, a shadow, a highlighter, and a size.

In certain embodiments of the present disclosure, the electronic device 100 can include the connection control processor 210 including the connection control program 113 to calculate a formula included in text. In another embodiment of the present disclosure, the electronic device 100 can include a separate connection control processing unit including the connection control program 113.

Figure 3A:
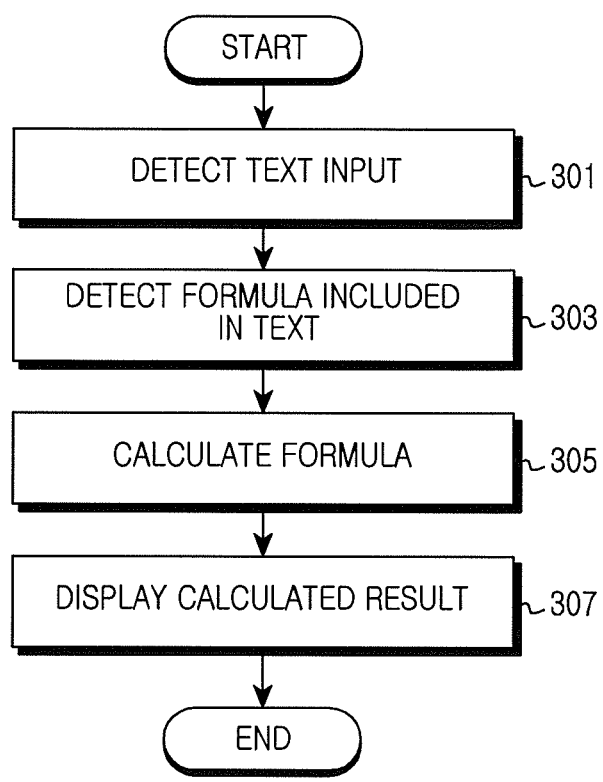
FIG. 3A illustrates a process of calculating a formula in an electronic device according to certain embodiments of the present disclosure.

FIG. 3A illustrates a process of calculating a formula in an electronic device according to certain embodiments of the present disclosure. Referring to FIGS. 1 and 3A, the electronic device 100 detects text input in step 301. For example, as show in FIG. 5A, the electronic device 100 displays text 505, 507, 509, and 511 input through an input device 501 displayed on the touch screen 150 on a memo application 503.

After the text input is detected, the electronic device 100 proceeds to step 303 and detects a formula included in the text. For example, the electronic device 100 detects a formula including a plurality of numerals and at least one operator. Herein, the electronic device 100 can verify whether there are data in a buffer memory which stores only a formula separately in input text. For example, the electronic device 100 can detect a formula included in a first region of the detected text.

Figure 5A:
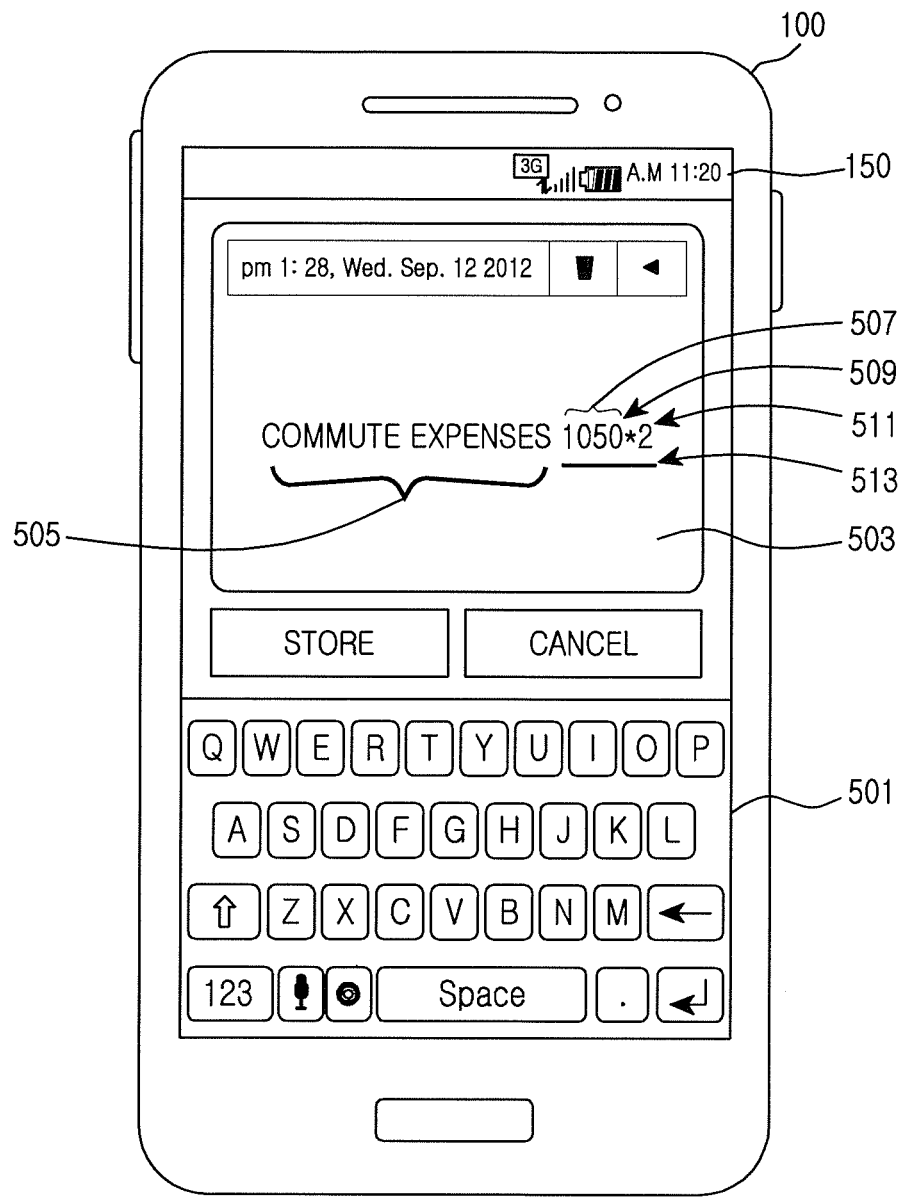
FIGS. 5A to 5E are screens illustrating a process of calculating a formula in an electronic device according to another embodiment of the present disclosure.
Figure 5B:
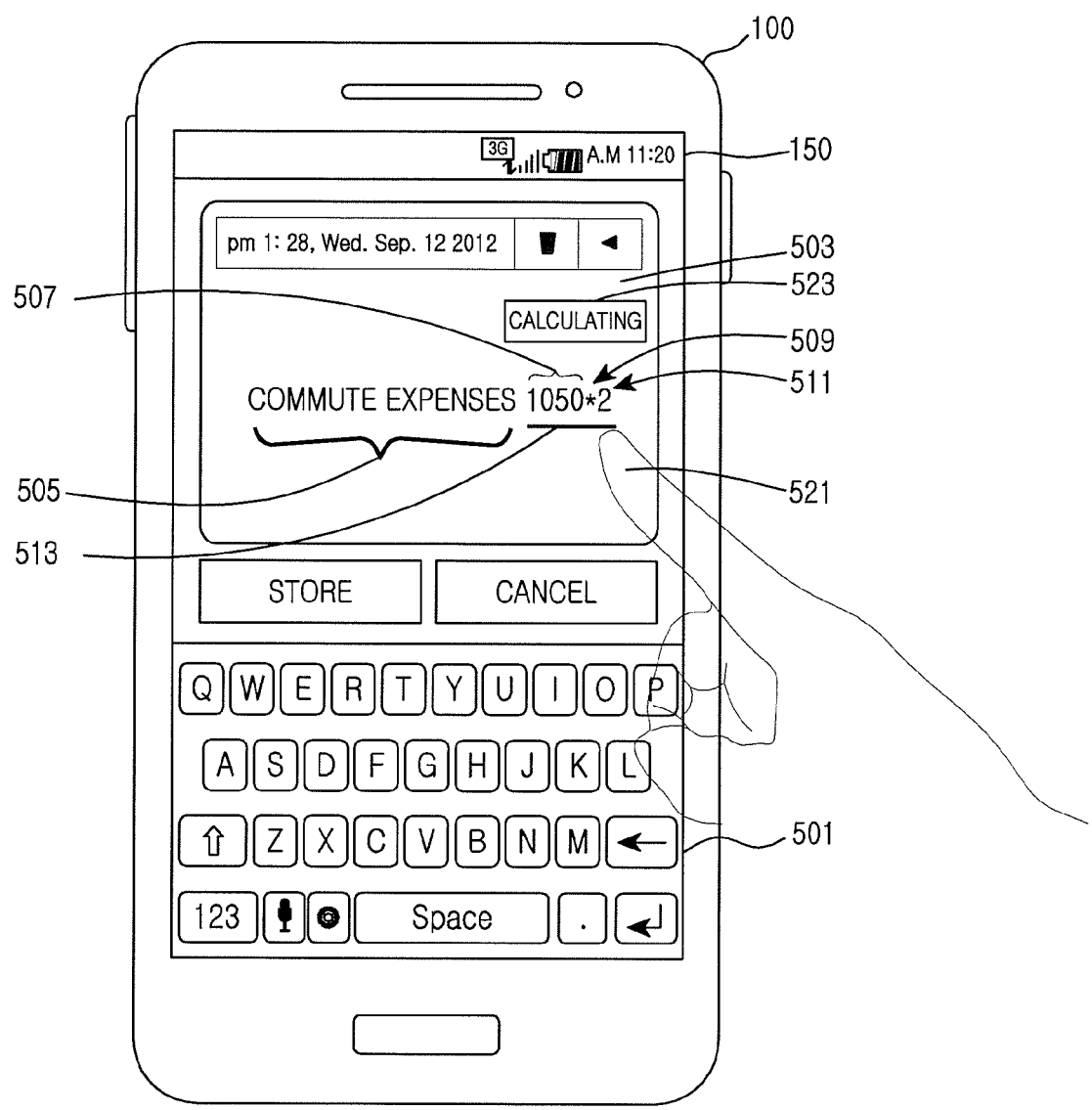

After the formula included in the text is detected, the electronic device 100 proceeds to step 305 and calculates the formula. For example, as shown in FIG. 5B, when input 521 for a "calculating" 523 displayed on the touch screen 150 is sensed, the electronic device 100 calculates the formula using a separate calculator application program. For example, as shown in FIG. 5B, when the input 521 for the "calculating" 523 displayed on the touch screen 150 is sensed, the electronic device 100 can process the formula using a calculation function included in the memo application 503. For example, as shown in FIG. 5B, when a "=" is selected in the input device 501 displayed on the touch screen 150, the electronic device 100 can calculate the formula using a separate calculator application program. For example, as shown in FIG. 5B, when the "=" is selected in the input device 501 displayed on the touch screen 150, the electronic device 100 can calculate the formula using a calculation function included in the memo application 503.

Figure 5C:
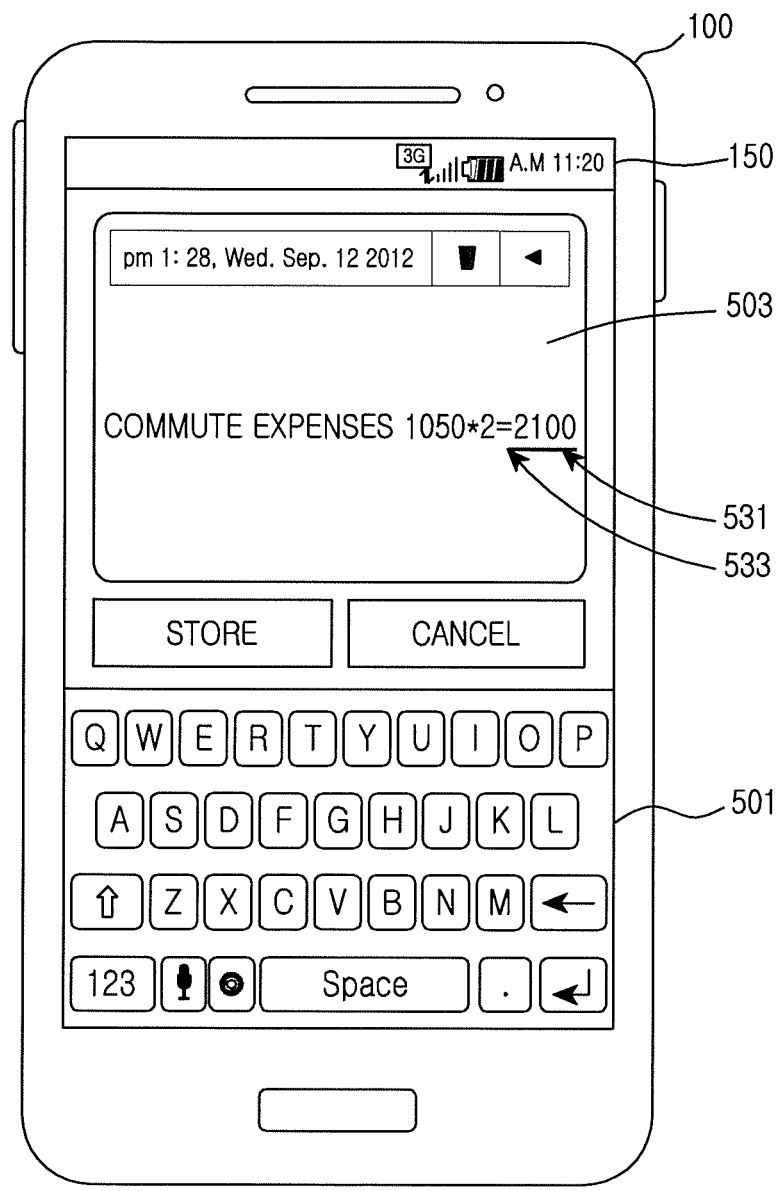

After the formula is performed, the electronic device 100 proceeds to step 307 and displays the calculated result. For example, as shown in FIG. 5C, the electronic device 100 displays a calculated result 531 together with the "=" 533 on the memo application program 533. Thereafter, the electronic device 100 can end the algorithm of FIG. 3A.

Figure 3B:
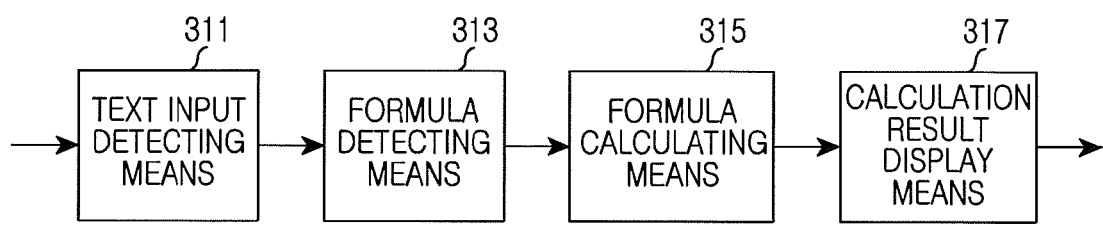
FIG. 3B illustrates a configuration of an electronic device for calculating a formula according to certain embodiments of the present disclosure.

As described above, the process of calculating a formula in the electronic device can be configured, as shown in FIG. 3B, as an apparatus for calculating a formula in the electronic device.

FIG. 3B illustrates a configuration of an electronic device for calculating a formula according to certain embodiments of the present disclosure.

Referring to FIGS. 1 and 3B, the electronic device 100 can include a text input detecting means, that is, a first means 311 for detecting text input, a formula detecting means, that is, a second means 313 for detecting a formula included in text, a formula calculating means, that is, a third means 315 for calculating the formula, and a calculation result display means, that is, a fourth means 317 for displaying the calculated result.

The first means 311 detects the text input. For example, as show in FIG. 5A, the first means 311 displays text 505, 507, 509, and 511 input through an input device 501 displayed on the touch screen 150 on a memo application 503.

The second means 313 detects the formula included in the text. For example, the second means 313 detects a formula including a plurality of numerals and at least one operator. Herein, the second means 313 can verify whether there are data in a buffer memory which stores only a formula separately in input text. For example, the second means 313 can detect a formula included in a first region of the detected text.

The third means 313 calculates the formula. For example, as shown in FIG. 5B, when input 521 for a "calculating" 523 displayed on the touch screen 150 is sensed, the third means 313 calculates the formula using a separate calculator application program. For example, as shown in FIG. 5B, when the input 521 for the "calculating" 523 displayed on the touch screen 150 is sensed, the third means 313 can process the formula using a calculation function included in the memo application 503. In another example, as shown in FIG. 5B, when a "=" is selected in the input device 501 displayed on the touch screen 150, the third means 313 can calculate the formula using a separate calculator application program. In another example, as shown in FIG. 5B, when the "=" is selected in the input device 501 displayed on the touch screen 150, the third means 313 can calculate the formula using a calculation function included in the memo application 503.

The fourth means 313 displays the calculated result. For example, as shown in FIG. 5C, the fourth means 313 displays a calculated result 531 together with the "=" 533 on the memo application program 533.

In certain embodiments of the present disclosure, the electronic device 100 can include means for calculating a formula. Also, the electronic device 100 can include respective means for calculating a formula as one means.

Figure 4:
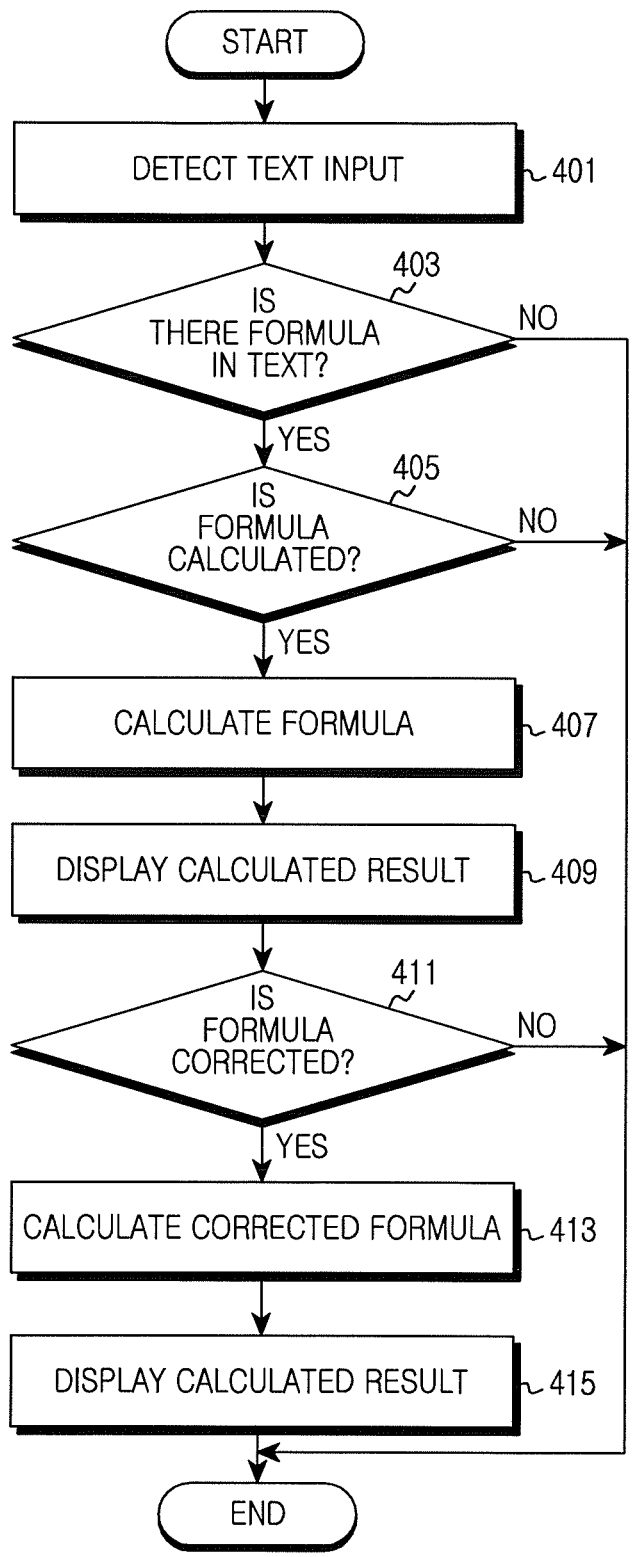
FIG. 4 illustrates a process of calculating a formula in an electronic device according to another embodiment of the present disclosure.

FIG. 4 illustrates a process of calculating a formula in an electronic device according to other embodiments of the present disclosure. Referring to FIGS. 1 and 4, the electronic device 100 detects text input in step 401. For example, as show in FIG. 5A, the electronic device 100 displays text 505, 507, 509, and 511 input through an input device 501 displayed on the touch screen 150 on a memo application 503.

After the text input is detected, the electronic device 100 proceeds to step 403 and verifies whether there is a formula in the text. For example, the electronic device 100 detects a formula including a plurality of numerals and at least one operator. Herein, the electronic device 100 can verify whether there are data in a buffer memory which stores only a formula separately in input text. If there is no formula in the text, the electronic device ends the algorithm of FIG. 4.

On the other hand, when there is the formula in the text, the electronic device 100 proceeds to step 405 and verifies whether to calculate the formula. For example, as shown in FIG. 5B, when there is the formula in the text, the electronic device 100 displays a "calculating" 523 through the touch screen 150. Thereafter, the electronic device 100 verifies whether input 521 for the "calculating" 523 is sensed. In another example, as shown in FIG. 5B, the electronic device 100 can verify whether a "=" is selected in the input device 501 displayed on the touch screen 150.

If the formula will not be calculated, the electronic device 100 ends the algorithm of FIG. 4. For example, as shown in FIG. 5B, when the input 521 for the "calculating" 523 is not sensed, the electronic device 100 recognizes that the formula is not calculated. In another example, as shown in FIG. 5B, when the "=" is not selected in the input device 501 displayed on the touch screen 150, the electronic device 100 can recognize that the formula is not calculated.

On the other hand, when the formula will be calculated, the electronic device 100 proceeds to step 407 and calculates the formula. For example, as shown in FIG. 5B, when the input 521 for the "calculating" 523 displayed on the touch screen 150 is sensed, the electronic device 100 calculates the formula using a separate calculator application program. In another example, as shown in FIG. 5B, when the input 521 for the "calculating" 523 displayed on the touch screen 150 is sensed, the electronic device 100 can process the formula using a calculation function included in a memo application 503. In another example, as shown in FIG. 5B, when the "=" is selected in the input device 501 displayed on the touch screen 150, the electronic device 100 can calculate the formula using a separate calculator application program. In another example, as shown in FIG. 5B, when the "=" is selected in the input device 501 displayed on the touch screen 150, the electronic device 100 can calculate the formula using a calculation function included in the memo application 503.

After the formula is performed, the electronic device 100 proceeds to step 409 and displays the calculated result. For example, as shown in FIG. 5C, the electronic device 100 displays a calculated result 531 together with the "=" 533 on the memo application program 533.

Figure 5D:
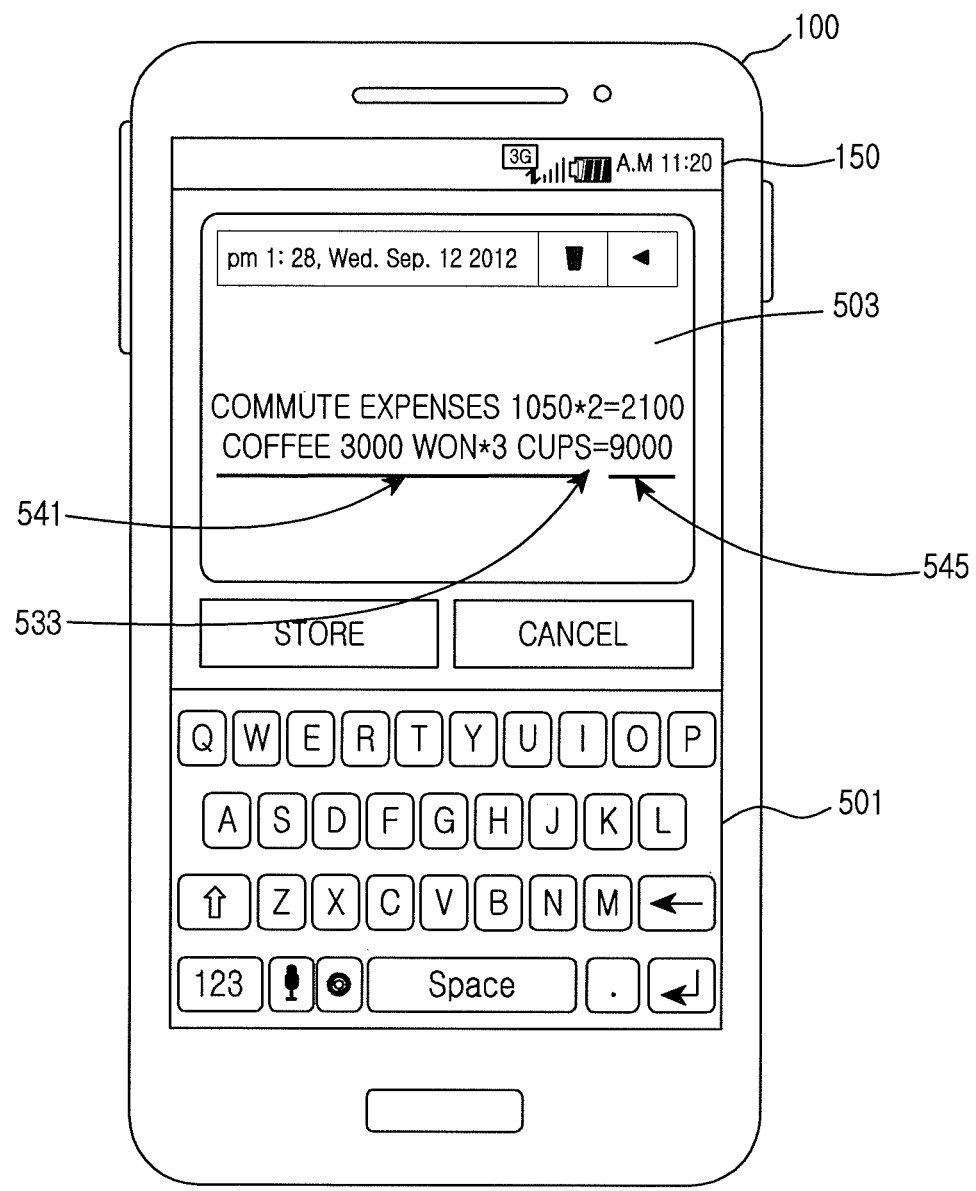
Figure 5E:
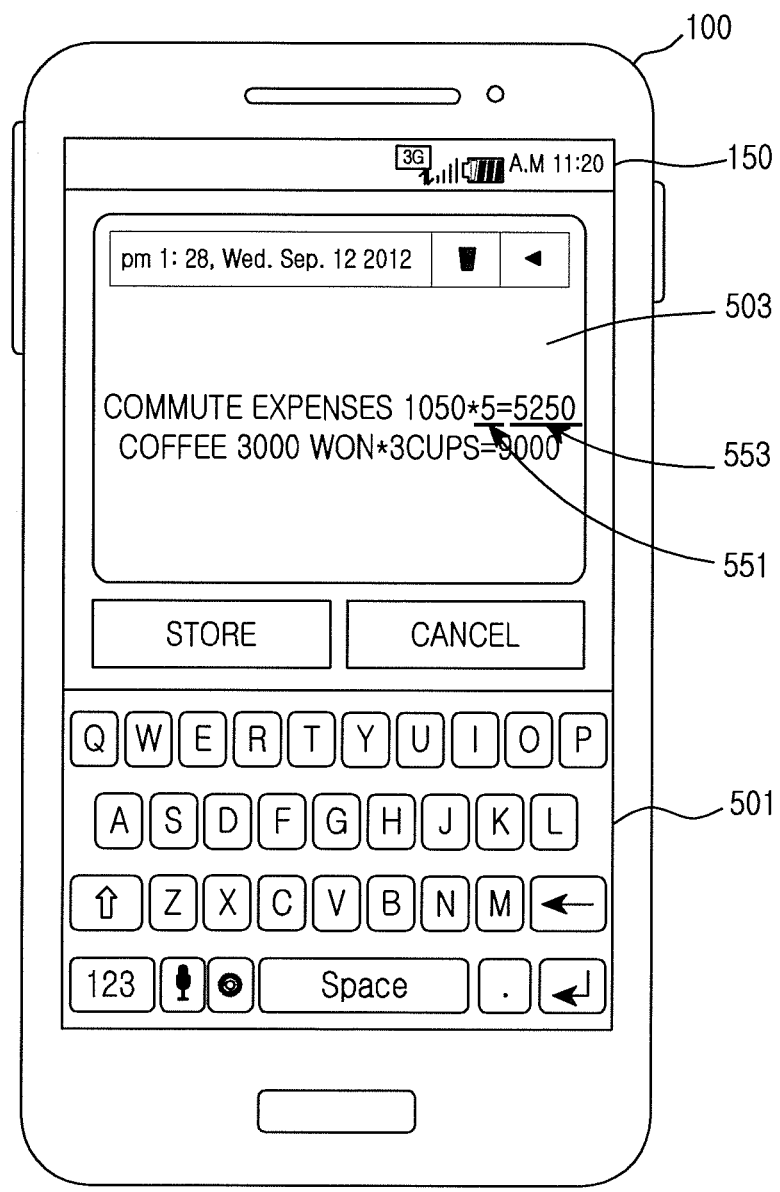

In addition, after the calculated result is displayed, the electronic device 100 proceeds to step 411 and verifies whether the formula is corrected. For example, as shown in FIGs. 5A and 5E, the electronic device 100 verifies whether the formula is corrected from the "2" 511 to a "5" 551. If the formula is not corrected, the electronic device 100 ends the algorithm of FIG. 4.

On the other hand, when the formula is corrected, the electronic device 100 proceeds to step 413 and calculates the corrected formula. For example, as shown in FIGS. 5A and 5E, when the formula is corrected from the "2" 511 to a "5" 551, the electronic device 100 calculates the formula using a separate calculator application program. In another example, as shown in FIGS. 5A and 5E, when the formula is corrected from the "2" 511 to a "5" 551, the electronic device 100 can calculate the formula using a calculation function included in the memo application 503.

After the corrected formula is calculated, the electronic device 100 proceeds to step 415 and displays the calculated result. For example, the electronic device 100 displays, as shown in FIG. 5E, a calculated result 553 of the corrected formula on the memo application program 503. Thereafter, the electronic device 100 ends the algorithm of FIG. 4.

In other embodiments of the present disclosure, the electronic device calculates the formula including only numerals and the operator. In other embodiments of the present disclosure, the electronic device 100 can calculate, as shown in FIG. 5D, a formula 541 including characters in addition to numerals and an operator and display the calculated result 545. Herein, it is assumed that the characters except for the numerals and the operator are ignored.

Figure 6:
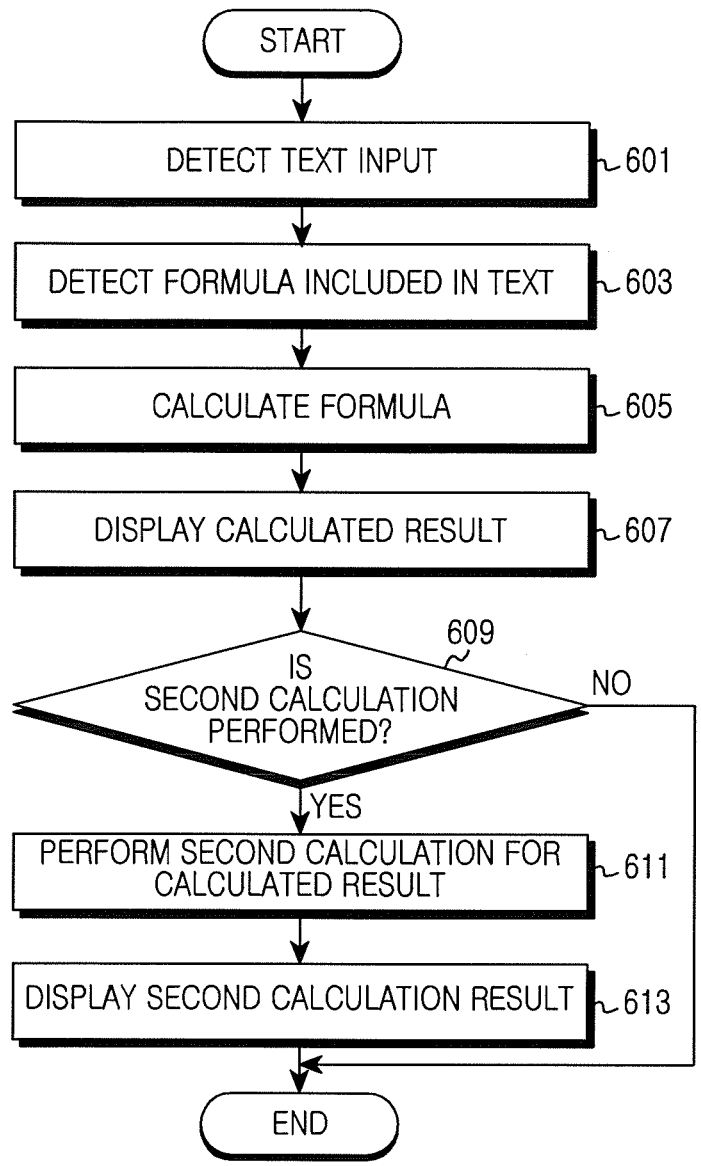
FIG. 6 illustrates a process of correcting a result of a formula in an electronic device according to certain embodiments of the present disclosure.

FIG. 6 illustrates a process of correcting a result of a formula in an electronic device according to certain embodiments of the present disclosure. Referring to FIGS. 1 and 6, the electronic device 100 detects text input in step 601. For example, as show in FIG. 5A, the electronic device 100 displays text 505, 507, 509, and 511 input through an input device 501 displayed on the touch screen 150 on a memo application 503.

After the text input is detected, the electronic device 100 proceeds to step 603 and detects a formula included in the text. For example, the electronic device 100 detects a formula including a plurality of numerals and at least one operator. Herein, the electronic device 100 can verify whether there are data in a buffer memory which stores only a formula separately in input text.

After the formula included in the text is detected, the electronic device 100 proceeds to step 605 and calculates the formula. For example, as shown in FIG. 5B, when input 521 for a "calculating" 523 displayed on the touch screen 150 is sensed, the electronic device 100 calculates the formula using a separate calculator application program. In another example, as shown in FIG. 5B, when the input 521 for the "calculating" 523 displayed on the touch screen 150 is sensed, the electronic device 100 can process the formula using a calculation function included in the memo application 503. In another example, as shown in FIG. 5B, when a "=" is selected in the input device 501 displayed on the touch screen 150, the electronic device 100 can calculate the formula using a separate calculator application program. In another example, as shown in FIG. 5B, when the "=" is selected in the input device 501 displayed on the touch screen 150, the electronic device 100 can calculate the formula using a calculation function included in the memo application 503.

After the formula is calculated, the electronic device 100 proceeds to step 607 and displays the calculated result. For example, as shown in FIG. 5C, the electronic device 100 displays a calculated result 531 together with the "=" 533 on the memo application program 533.

Figure 7A:
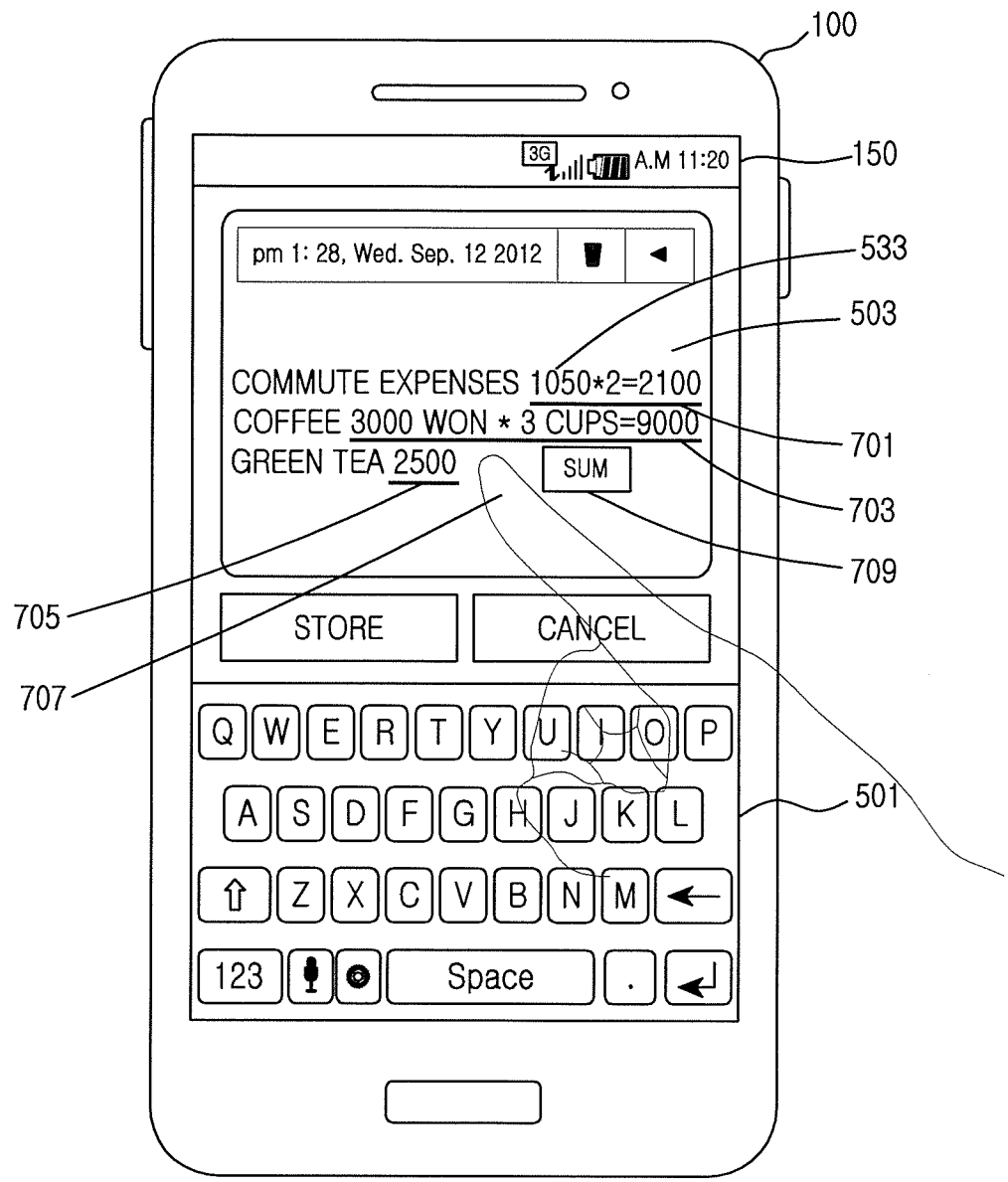
FIGS. 7A to 7D are screens illustrating a process of correcting a result of a formula in an electronic device according to certain embodiments of the present disclosure.

After the calculated result is displayed, the electronic device 100 proceeds to step 609 and verifies whether to perform a second calculation for the calculated result. Herein, the second calculation can include at least one of a sum and an average. For example, as shown in FIG. 7A, when an operation 707 of a user is generated, the electronic device 100 displays a "sum" 709 through the touch screen 150. Thereafter, the electronic device 100 verifies whether input for the "sum" 709 is sensed. In another example, as shown in FIG. 7A, the electronic device 100 can verify whether a "+" and a "−" are selected in the input device 501 displayed on the touch screen 150.

If the second calculation for the calculated result will not be performed, the electronic device 100 ends the algorithm of FIG. 7. For example, as shown in FIG. 7A, when the input for the "sum" 709 is not sensed, the electronic device 100 recognizes that the second calculation is not performed. In another example, as shown in FIG. 7A, when the "+" and the "−" are not selected in the input device 501 displayed on the touch screen 150, the electronic device 100 can recognize that the second calculation is not performed.

On the other hand, when the second operation for the calculated result will be performed, the electronic device 100 proceeds to step 611 and performs the second operation. For example, as shown in FIG. 7A, when the input for the "sum" 709 displayed on the touch screen 150 is sensed, the electronic device 100 performs the second calculation using a separate calculator application. In another example, as shown in FIG. 7A, when the input for the "sum" 709 displayed on the touch screen 150 is sensed, the electronic device 100 can perform the second calculation using a calculation function included in the memo application 503.

Figure 7B:
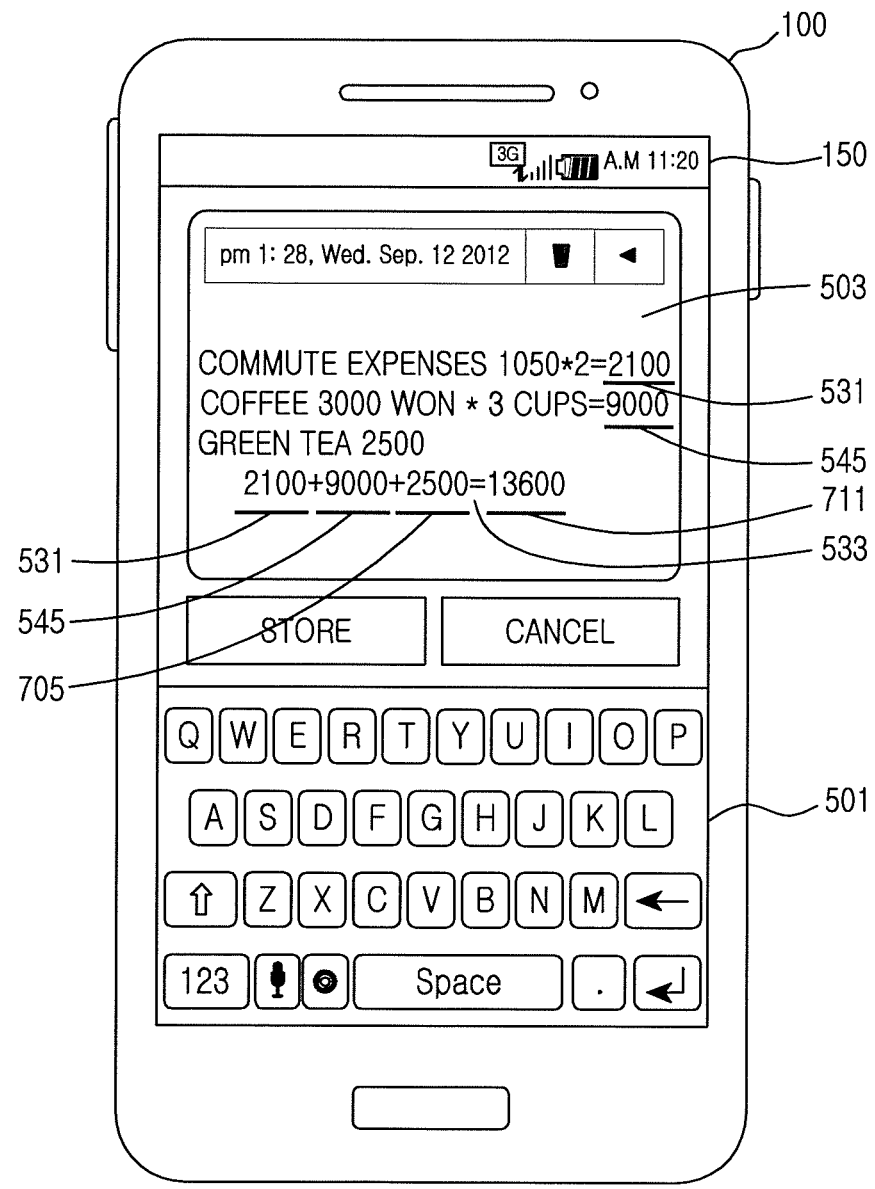

After the second calculation for the calculated result is performed, the electronic device 100 proceeds to step 613 and displays the second calculation result. For example, as shown in FIG. 7B, the electronic device 100 displays a second calculation result value 711 on the memo application 503. Herein, it is assumed that the "sum" 709 is a menu for adding all of result values 531 and 545 of a previously calculated formula included in the text shown in FIG. 7A and a value 705 which is not calculated. Herein, as shown in FIG. 7B, the electronic device 100 can display values 531, 545, and 705 used for the second calculation result value 711.

Figure 7C:
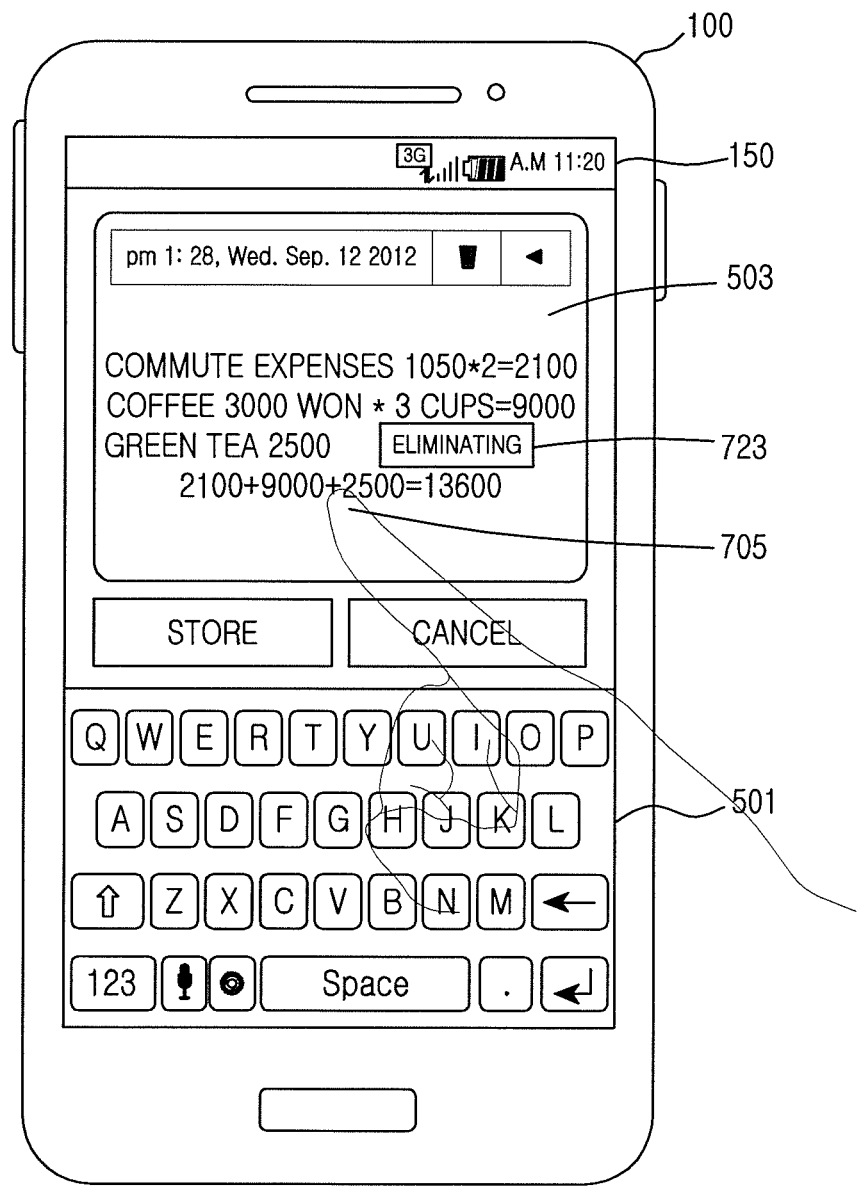
Figure 7D:
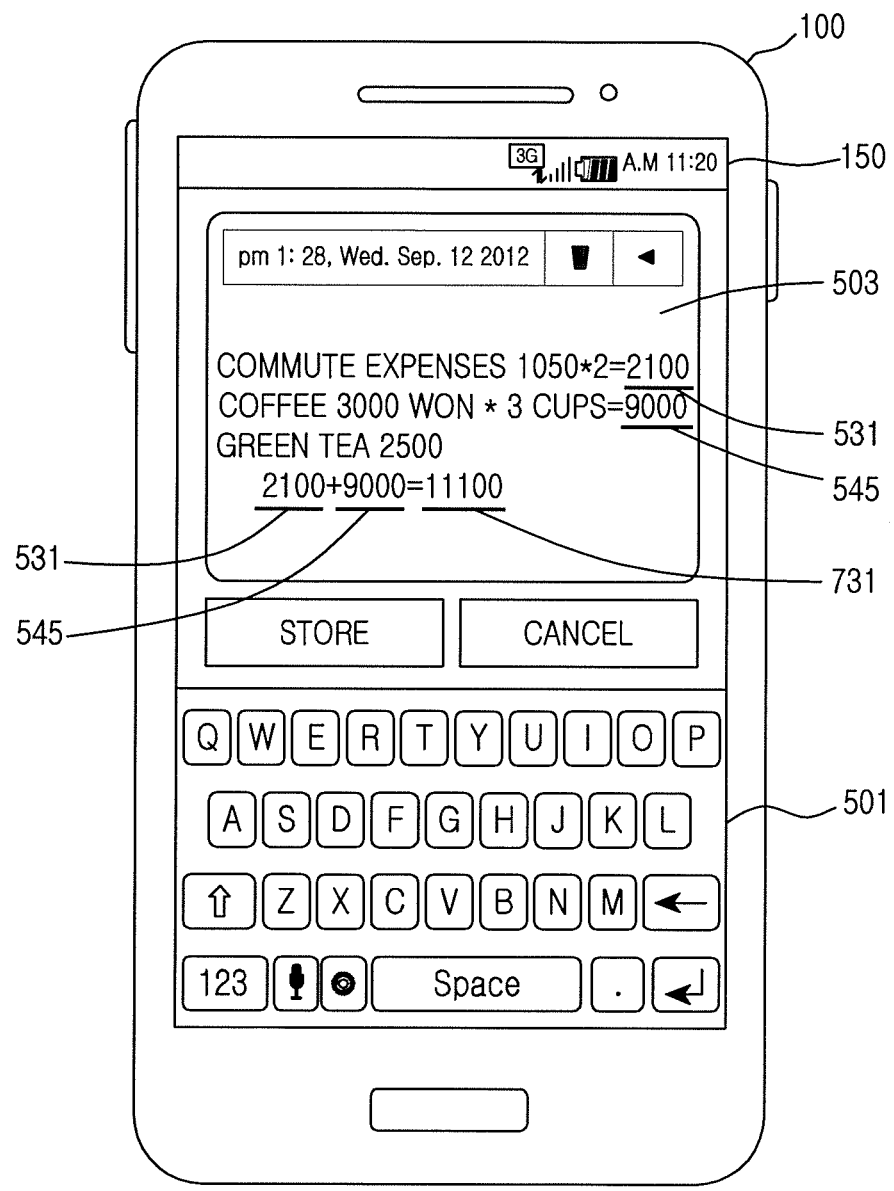

In addition, after the second calculation result is displayed, when the formula is changed, the electronic device 100 can calculate and display the changed formula. For example, as shown in FIG. 7C, when input for the "2500" 705 is sensed during a reference time or more, the electronic device 100 displays an "eliminating" 723 on the memo application 503. At this time, when input for the "eliminating" 723 is sensed, the electronic device 100 displays, as shown in FIG. 7D, a calculated result 731 except for the "2500" 705. Herein, the description was given for the "eliminating" 723 as an example of the formula correction. However, examples of the formula correction can include an "adding" and a "correcting". Thereafter, the electronic device 100 ends the algorithm of FIG. 6.

Figure 8:
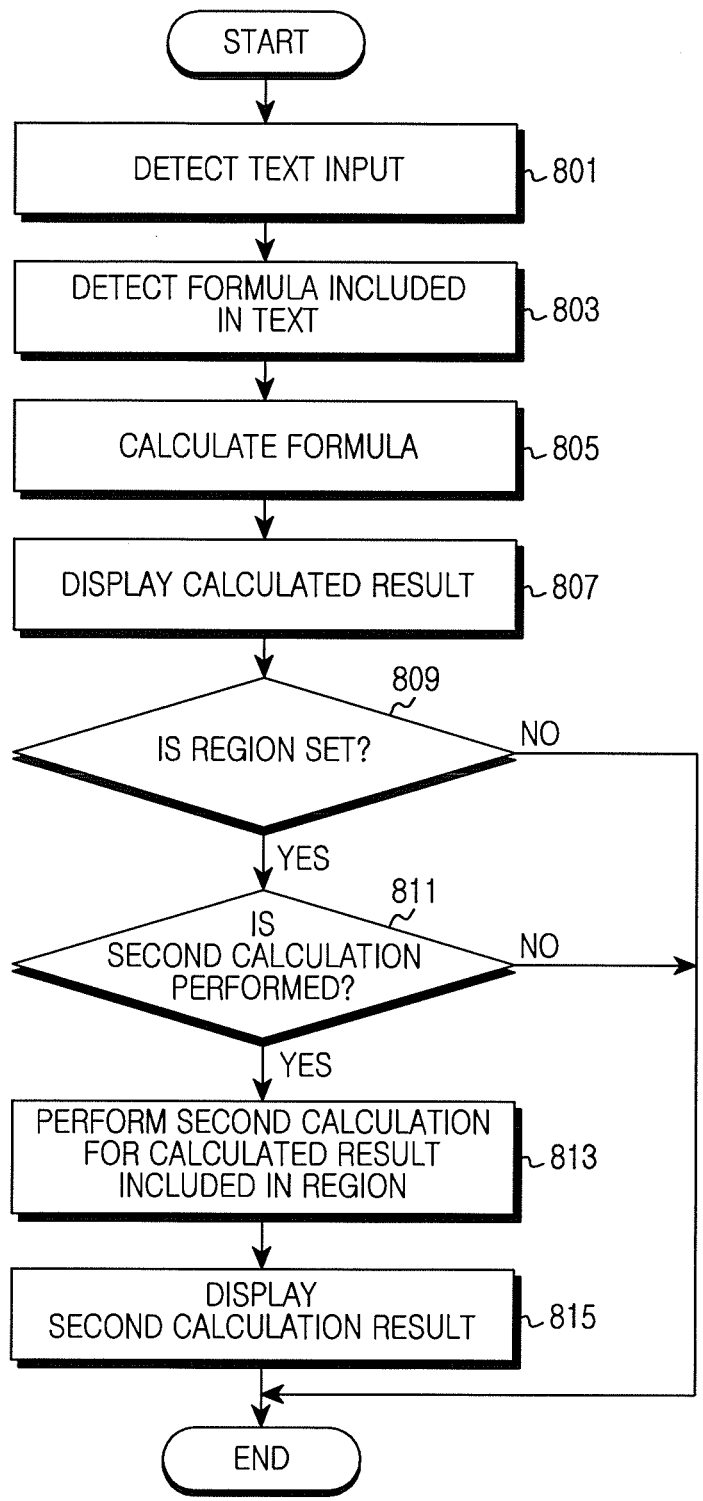
FIG. 8 illustrates a process of calculating a formula for a specific region in an electronic device according to certain embodiments of the present disclosure.

FIG. 8 illustrates a process of calculating a formula for a specific region in an electronic device according to certain embodiments of the present disclosure. Referring to FIGS. 1 and 8, the electronic device 100 detects text input in step 801. For example, as show in FIG. 5A, the electronic device 100 displays text 505, 507, 509, and 511 input through an input device 501 displayed on the touch screen 150 on a memo application 503.

After the text input is detected, the electronic device 100 proceeds to step 803 and detects a formula included in the text. For example, the electronic device 100 detects a formula including a plurality of numerals and at least one operator. Herein, the electronic device 100 can verify whether there are data in a buffer memory which stores only a formula separately in input text.

After the formula included in the text is detected, the electronic device 100 proceeds to step 805 and calculates the formula. For example, as shown in FIG. 5B, when input 521 for a "calculating" 523 displayed on the touch screen 150 is sensed, the electronic device 100 calculates the formula using a separate calculator application program. In another example, as shown in FIG. 5B, when the input 521 for the "calculating" 523 displayed on the touch screen 150 is sensed, the electronic device 100 can process the formula using a calculation function included in the memo application 503. In another example, as shown in FIG. 5B, when a "=" is selected in the input device 501 displayed on the touch screen 150, the electronic device 100 can calculate the formula using a separate calculator application program. In another example, as shown in FIG. 5B, when the "=" is selected in the input device 501 displayed on the touch screen 150, the electronic device 100 can calculate the formula using a calculation function included in the memo application 503.

After the formula is calculated, the electronic device 100 proceeds to step 807 and displays the calculated result. For example, as shown in FIG. 5C, the electronic device 100 displays a calculated result 531 together with the "=" 533 on the memo application program 533. After the calculated result is displayed, the electronic device 100 proceeds to step 809 and verifies whether a region is set. If the region is not set, the electronic device 100 ends the algorithm of FIG. 8.

Figure 9A:
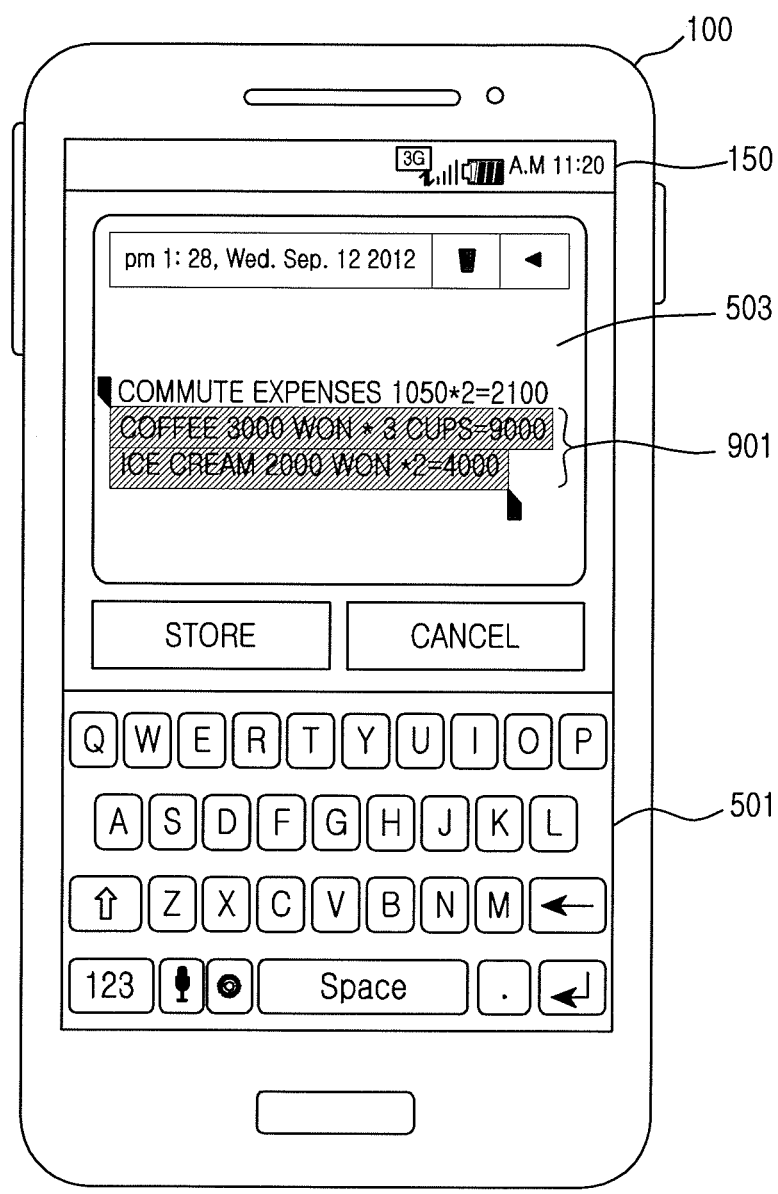
FIGS. 9A to 9C are screens illustrating a process of calculating a formula for a specific region in an electronic device according to certain embodiments of the present disclosure.
Figure 9B:
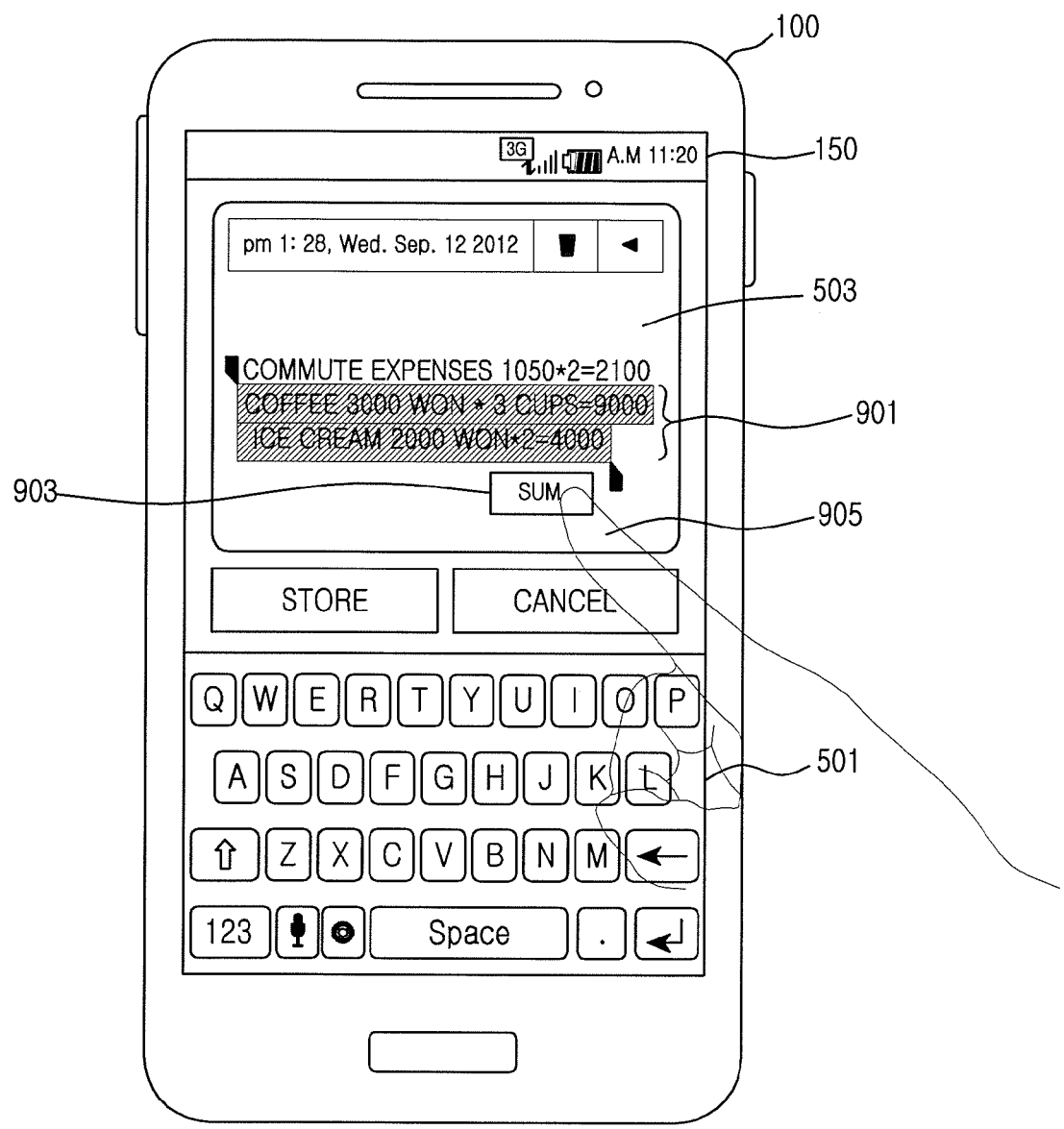

When the region is set, the electronic device 100 proceeds to step 811 and verifies whether to perform second calculation for the calculated result in which the region is set. For example, as shown in FIG. 9A, when a region 901 is set to the calculated result displayed on the touch screen 150, the electronic device 100 verifies, as shown in FIG. 9B, whether input for a "sum" 903 displayed on the touch screen 150 is sensed. In another example, as shown in FIG. 9B, the electronic device 100 can verify whether a "+" and a "−" are selected in the input device 501 displayed on the touch screen 150.

If the second calculation for the calculated result will not be performed, the electronic device 100 ends the algorithm of FIG. 8. For example, as shown in FIG. 9B, when the input for the "sum" 903 displayed through the touch screen 150 is not sensed, the electronic device 100 recognizes that the second calculation is not performed. In another example, as shown in FIG. 9A, when the "+" and the "−" are not selected in the input device 501 displayed on the touch screen 150, the electronic device 100 can recognize that the second calculation is not performed.

On the other hand, when the second operation for the calculated result will be performed, the electronic device 100 proceeds to step 813 and performs the second operation for the calculated result included in the region. For example, as shown in FIG. 9B, when the input for the "sum" 903 displayed on the touch screen 150 is sensed, the electronic device 100 performs the second calculation using a separate calculator application. In another example, as shown in FIG. 9B, when the input for the "sum" 903 displayed on the touch screen 150 is sensed, the electronic device 100 can perform the second calculation using a calculation function included in the memo application 503.

Figure 9C:
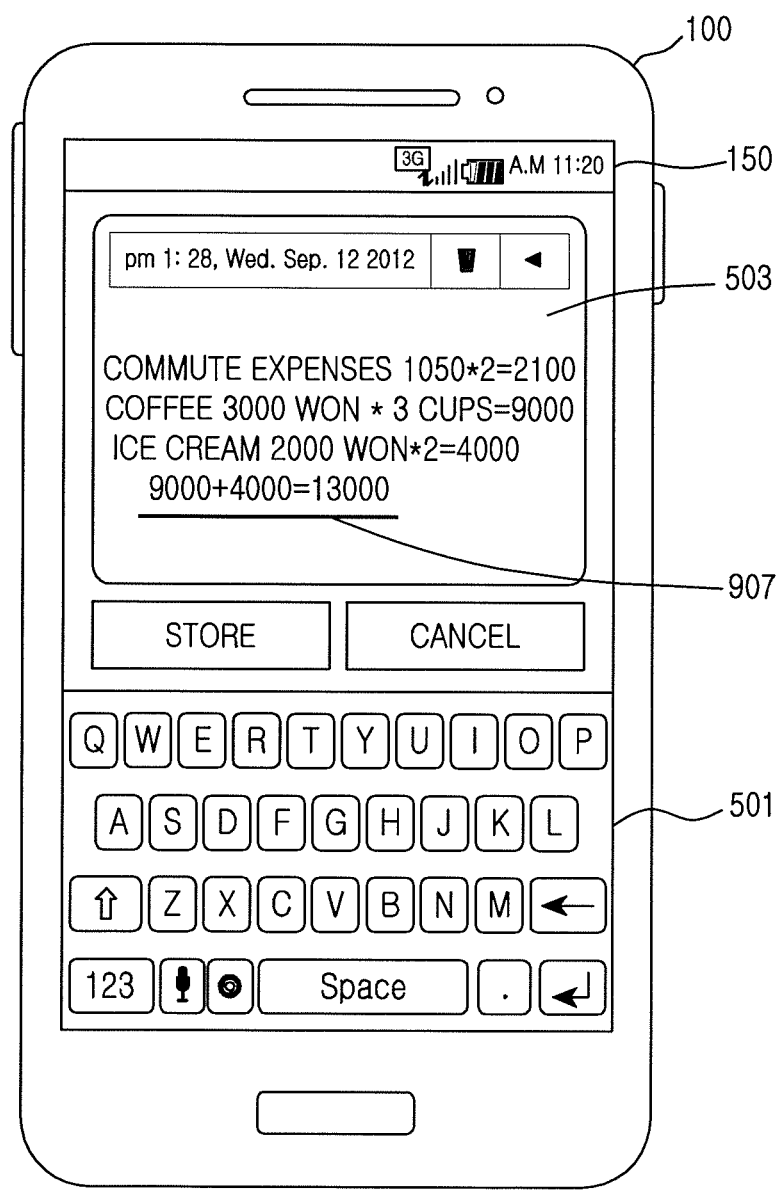

After the second calculation for the calculated result is performed, the electronic device 100 proceeds to step 815 and displays the second calculation result. For example, as shown in FIG. 9C, the electronic device 100 displays the second calculation result value 907 on the memo application 503. Herein, the electronic device 100 can display values used for the second calculation in addition to the second calculation result value. Thereafter, the electronic device 100 ends the algorithm of FIG. 8.

In certain embodiments of the present disclosure, the electronic device 100 performs the second calculation for a calculated result included in a region among calculated results. In other embodiments of the present disclosure, the electronic device 100 can calculate a formula included in a region in text.

It will be appreciated that embodiments of the present disclosure according to the claims and description in the specification can be realized in the form of hardware, software or a combination of hardware and software. Any such software can be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software can be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs can be conveyed electronically via any medium such as a communication signal carried over a wired or wireless connection and embodiments suitably encompass the same.

As described above, the electronic device has an advantage in that it is unnecessary for a user thereof to drive a separate calculator application program by calculating a formula included in text in an application program.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method in an electronic device, the method comprising:
   detecting a text;
   detecting at least one formula included in the detected text;
   displaying an icon for formula calculation after the at least one formula is detected;
   calculating the at least one formula when a selection for the icon is sensed; and
   displaying the calculated result.

2. The method of claim 1, wherein the at least one formula includes a plurality of numerals and at least one operator.

3. The method of claim 1, wherein the detecting the at least one formula comprises:
   verifying a first region for detecting the at least one formula in the text; and
   detecting the at least one formula included in the first region.

4. The method of claim 1, wherein the detecting the at least one formula comprises detecting the at least one formula when input for the calculation of the at least one formula is sensed.

5. The method of claim 1, wherein the calculating the at least one formula comprises calculating a formula included in a first region among the at least one formula.

6. The method of claim 1, further comprising:
   verifying whether the calculated result includes a plurality of calculated result values after the calculated result is displayed;
   displaying an item for a second calculation when the calculated result includes the plurality of calculated result values;
   performing the second calculation for the plurality of calculated result values when a selection for the item is sensed; and
   displaying the second calculation result.

7. The method of claim 6, wherein the second calculation includes at least one of a sum and an average.

8. The method of claim 6, wherein the verification whether the calculated result includes the plurality of calculated result values comprises:
   verifying a second region, for verifying whether the calculated result includes the plurality of calculated result values, in the displayed calculated result; and
   verifying whether the calculated result included in the second region includes the plurality of calculated result values.

9. The method of claim 6, wherein the performance of the second calculation comprises performing the second calculation for calculated result values included in the second region among the plurality of calculated result values.

10. An electronic device comprising:
    a touch screen
    at least one processor;
    at least one memory; and
    at least one program which is stored in the at least one memory and is configured to be executable by the at least one processor,
       wherein the at least one program detects input text, detects at least one formula included in the detected text, controls the touch screen to display an item for formula calculation after the at least one formula is detected, calculates the at least one formula when a selection for the item is sensed, and displays the calculated result.

11. The electronic device of claim 10, wherein the formula includes a plurality of numerals and at least one operator.

12. The electronic device of claim 10, wherein the at least one processor verifies a first region for detecting the at least one formula in the text and detects the at least one formula included in the first region.

13. The electronic device of claim 10, wherein the at least one processor detects at least the one formula when input for the calculation of the at least one formula is sensed.

14. The electronic device of claim 10, wherein the at least one processor calculates a formula included in a first region among the at least one formula.

15. The electronic device of claim 10, wherein the at least one processor further includes a program for verifying whether the calculated result includes a plurality of calculated result values after the calculated result is displayed, displaying an item for a second calculation when the calculated result includes the plurality of calculated result values, performing the second calculation for the plurality of calculated result values when a selection for the item is sensed, and displaying the second calculation result.

16. The electronic device of claim 15, wherein the second calculation includes at least one of a sum and an average.

17. The electronic device of claim 15, wherein the at least one processor verifies a second region for verifying whether the calculated result includes the plurality of calculated result values in the displayed calculated result and verifies whether the calculated result included in the second region includes the plurality of calculated result values.

18. The electronic device of claim 15, wherein the at least one processor performs the second calculation for calculated result values included in the second region among the plurality of calculated result values.

* * * * *